US012522001B2

(12) United States Patent
Atsumi

(10) Patent No.: US 12,522,001 B2
(45) Date of Patent: Jan. 13, 2026

(54) PRINTER

(71) Applicant: Roland DG Corporation, Hamamatsu (JP)

(72) Inventor: Hidetoshi Atsumi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 154 days.

(21) Appl. No.: 18/509,393

(22) Filed: Nov. 15, 2023

(65) Prior Publication Data

US 2024/0165969 A1 May 23, 2024

(30) Foreign Application Priority Data

Nov. 17, 2022 (JP) ................................ 2022-184418
Nov. 9, 2023 (JP) ................................ 2023-191889

(51) Int. Cl.
*B41J 11/00* (2006.01)

(52) U.S. Cl.
CPC .... *B41J 11/00218* (2021.01); *B41J 11/00214* (2021.01)

(58) Field of Classification Search
CPC ........................ B41J 11/00218; B41J 11/00214
See application file for complete search history.

(56) References Cited

U.S. PATENT DOCUMENTS

2021/0252881 A1* 8/2021 Miyazawa ............ B41J 25/308

FOREIGN PATENT DOCUMENTS

JP 2021-062482 A 4/2021

* cited by examiner

*Primary Examiner* — Justin Seo
(74) *Attorney, Agent, or Firm* — Keating & Bennett, LLP

(57) ABSTRACT

A printer includes a conveyor to convey a medium placed on a table, an ink head including a first nozzle group to discharge a first ultraviolet curable ink and a second nozzle group to discharge a second ultraviolet curable ink before or after the first ultraviolet curable ink is discharged, and mounted on a carriage, an ultraviolet irradiator on the carriage to irradiate the ultraviolet curable inks discharged onto the medium with ultraviolet light, and an attachment structure including fixing portions to fix the ultraviolet irradiator. A position of the ultraviolet irradiator with respect to the carriage is changeable by selecting one of the fixing portions depending on whether a conveying direction of the table is unidirectional or bidirectional.

9 Claims, 10 Drawing Sheets

PRINTER

CROSS REFERENCE TO RELATED APPLICATIONS

This application claims the benefit of priority to Japanese Patent Application No. 2022-184418 filed on Nov. 17, 2022 and Japanese Patent Application No. 2023-191889 filed on Nov. 9, 2023. The entire contents of these applications are hereby incorporated herein by reference.

BACKGROUND OF THE INVENTION

1. Field of the Invention

The present invention relates to improvement technologies for printers.

2. Description of the Related Art

A printer includes an ink head mounted on a carriage to discharge an ultraviolet curable ink, and an ultraviolet irradiator that irradiates the discharged ultraviolet curable ink with ultraviolet light. As a conventional technology regarding such a printer, there is a technology disclosed in Japanese Laid-Open Patent Publication No. 2021-062482.

A printer disclosed in Japanese Laid-Open Patent Publication No. 2021-062482 includes a plurality of inkjet heads that discharge an ultraviolet curable ink, a carriage on which the inkjet heads are mounted, a carriage drive mechanism that reciprocates the carriage in a main scanning direction, and two ultraviolet irradiation units including ultraviolet irradiators that cure the ink by irradiating the ink, which is discharged from the inkjet heads, with ultraviolet light.

Each ultraviolet irradiator can be reciprocated in a sub-scanning direction with respect to the carriage by driving the corresponding motor. For example, when a white ink is discharged from the inkjet heads disposed on the front side of the carriage, the ultraviolet irradiators are moved to the front side. When a color ink is discharged from the inkjet heads disposed on the rear side of the carriage, the ultraviolet irradiators are moved to the rear side.

In addition, in a printer, normal printing in which only the same type color inks (CMYK) on a medium are discharged from color ink heads (first usage) and special printing in which a special ink different from the color ink is discharged from a special ink head before or after the color ink (CMYK) is discharged onto the medium (second usage) are known.

In either usage, in order to completely cure the ultraviolet curable ink discharged onto the medium, it is necessary to ensure a cumulative irradiation amount of ultraviolet light from the ultraviolet irradiator with which the ink is irradiated. The cumulative irradiation amount of ultraviolet light is known as the cumulative value of the ultraviolet irradiance and the irradiation time. In order to completely cure the ink discharged from a nozzle on a downstream side in a conveying direction of the medium, an irradiation area is expanded to the downstream side in the conveying direction of the medium from the nozzle on the downstream side to ensure the irradiation time of ultraviolet light required for curing.

In the case of normal printing, the conveying direction is only on one side from the rear to the front. For this reason, the irradiation area is expanded only to the front side of the nozzle on the downstream side of the color ink head (downstream side in the conveying direction) to ensure the cumulative irradiation amount.

On the other hand, in the case of special printing, the conveying direction differs depending on the timing that the special ink is discharged. When the special ink is discharged before the color ink is discharged (primary coating formation), the conveying direction is defined such that the special ink head is located on the upstream side of the color ink head in the conveying direction, and when the special ink is discharged after the color ink is discharged (gloss formation), the conveying direction is defined such that the special ink head is located on the downstream side of the color ink head in the conveying direction.

Therefore, the conveying directions are opposite between when the special ink is discharged before the color ink is discharged (primary coating formation) and when the special ink is discharged after the color ink is discharged (gloss formation). For this reason, in the case of special printing, it is necessary to secure the irradiation area expanded to the downstream side in the conveying direction from the nozzle on the downstream side in each conveying direction, namely, to the front or rear of a nozzle length in the color ink head and the special ink head (hereinafter, abbreviated as the "nozzle length").

In the case of normal printing, the irradiation area expanded only to the front side with respect to the color ink head may be secured. However, in the case of special printing, it is necessary to secure the irradiation area expanded to the front or rear of the nozzle length. For this reason, in order to accommodate the case of special printing, a UV lamp (ultraviolet irradiator) is disposed such that the center of the nozzle length and the center of the UV lamp coincide with each other, so that the irradiation area expanded in a front-rear direction of the nozzle length is secured.

SUMMARY OF THE INVENTION

Depending on the purpose of using the printer, continuing to use only normal printing from the initial introduction of the printer may be preferable since printing efficiency is increased. In that case, the cumulative irradiation amount may be secured by expanding the irradiation area only to the front side (downstream side in the conveying direction in which the medium is conveyed from the rear to the front) with respect to the color ink head. However, since the UV lamp (ultraviolet irradiator) is disposed with respect to the ink head to accommodate special printing, an expanded area secured on the rear side (upstream side in the conveying direction) becomes a wasteful irradiation area that does not contribute to curing.

If the wasteful irradiation area can be eliminated, the irradiation area that contributes to curing can be expanded, so that the printing speed can be increased or the light intensity of the UV lamp can be set to be weaker than when the wasteful irradiation area is provided, which is a merit.

However, whether to use only normal printing or to use special printing depends on the purchaser's preference, so that it cannot be predicted in advance. For that reason, it has been difficult to eliminate a wasteful irradiation area that does not contribute to the curing of the ink.

Preferred embodiments of the present invention provide technologies capable of eliminating a wasteful irradiation area, which occurs depending on the type of printing selected and which does not contribute to the curing of an ink, by adjusting the position of an ultraviolet irradiator in a sub-scanning direction with respect to a carriage with a simple configuration.

According to a preferred embodiment of the present invention, a printer includes a table to place a medium, a conveyor to convey the medium placed on the table in a conveying direction, a carriage to perform scanning in a direction different from the conveying direction of the medium, an ink head including a first nozzle group to discharge a first ultraviolet curable ink and a second nozzle group to discharge a second ultraviolet curable ink before or after the first ultraviolet curable ink is discharged or at the same time as the first ultraviolet curable ink is discharged, and mounted on the carriage, an ultraviolet irradiator on at least one side in the scanning direction of the carriage with respect to the carriage to irradiate the first ultraviolet curable ink and the second ultraviolet curable ink with ultraviolet light, the first and the second ultraviolet curable inks being discharged onto the medium, and an attachment structure including a plurality of fixing portions to fix the ultraviolet irradiator. The conveyor is operable to convey the table or the medium unidirectionally from one side to the other side or from the other side to the one side in the conveying direction of the medium or bidirectionally from the one side to the other side and from the other side to the one side in the conveying direction of the medium depending on types of the first and the second ultraviolet curable inks discharged from the first nozzle group and the second nozzle group. A position of the ultraviolet irradiator with respect to the carriage is changeable by selecting one fixing portion from the plurality of fixing portions depending on whether the conveying direction of the table or the medium is unidirectional or bidirectional.

According to preferred embodiments of the present invention, with a simple configuration, a wasteful irradiation area which occurs depending on the type of printing selected and which does not contribute to the curing of the ink can be eliminated by adjusting the position of the ultraviolet irradiator in the sub-scanning direction with respect to the carriage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the attached drawings. Configurations illustrated in the attached drawings are merely examples, and the present invention is not limited to such configurations. In the description, right and left refers to the right and left with reference to a printer as viewed from the front, and front and rear refers to the front and rear with reference to a feeding direction of a medium. In addition, in the figures, Fr, Rr, Le, Ri, Up, and Dn indicate front, rear, left, right, up, and down, respectively.

Figure 1:
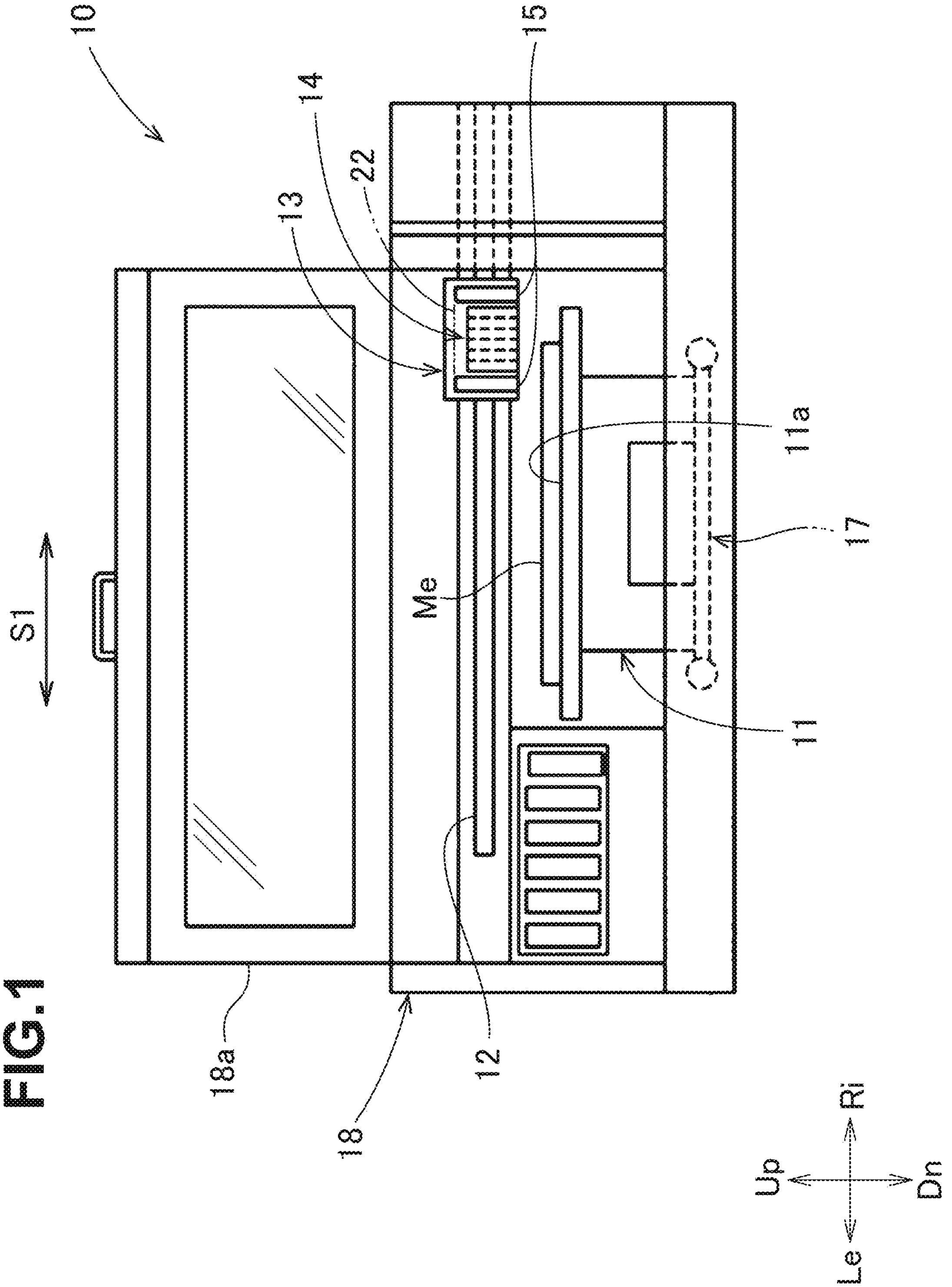
FIG. 1 is a view of a printer according to a preferred embodiment of the present invention with a cover opened as viewed from the front.
Figure 2:
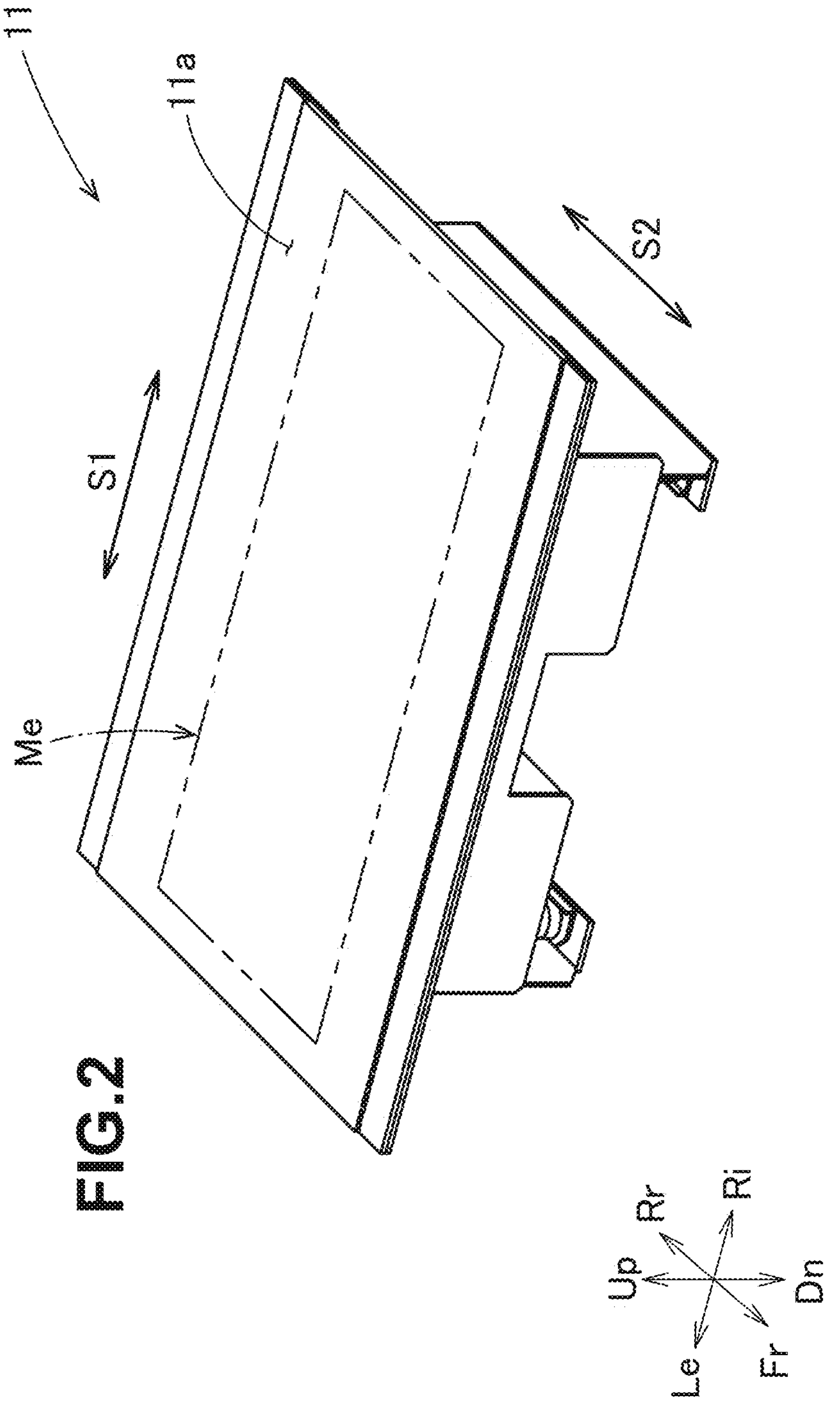
FIG. 2 is a perspective view of a table illustrated in FIG. 1.

As illustrated in FIGS. 1 and 2, a printer 10 is an inkjet printer capable of forming a color image on a medium Me, for example.

Here, a width direction S1 of the medium Me with reference to a feeding direction S2 (conveying direction S2) of the medium Me sent by a conveyor 17 of the printer 10 may be appropriately referred to as a "main scanning direction S1". In addition, the feeding direction S2 of the medium Me may be appropriately referred to as a "sub-scanning direction S2". The sub-scanning direction S2 is a direction orthogonal to the main scanning direction S1 as the printer 10 is viewed from above.

The medium Me to be printed is, for example, a flat material such as printing paper, and the material of the medium may be papers such as plain paper, resins such as polyvinyl chloride resin and polyester resin, or metals such as aluminum material and iron material, and can be made of various materials.

The printer 10 includes a table 11 to place the medium Me on an upper surface 11*a*, a rail 12 located above the table 11 and extending in the main scanning direction S1; a carriage 13 movably provided on the rail 12, and an ink head 14 (print head 14) and at least one (for example, two) ultraviolet irradiator 15, 15 mounted on the carriage 13.

The conveyor 17 (table conveyor 17) is configured to be capable of conveying the table 11 in the conveying direction S2 (sub-scanning direction S2). More specifically, the conveyor 17 is configured to be capable of conveying the medium Me placed on the upper surface 11*a* of the table 11 (medium placement surface 11*a*) in both conveying directions such as a bidirectional conveying direction from one side to the other side and from the other side to the one side in the conveying direction S2 (sub-scanning direction S2) of the medium Me and a unidirectional conveying direction only from the one side to the other side.

The table 11, the rail 12, the carriage 13, the ink head 14, the ultraviolet irradiator 15, 15, and the conveyor 17 are accommodated in a casing 18. The front of the casing 18 is covered with a cover 18*a* illustrated in FIG. 1 that can be opened upward.

The carriage 13 can scan the medium placement surface 11*a* of the table 11 in the direction S1 (main scanning direction S1) different from the sub-scanning direction S2.

The ink head 14 discharges an ultraviolet curable ink (photocurable ink) onto the medium Me placed on the medium placement surface 11*a*.

The ultraviolet irradiator 15, 15 is disposed on at least one side (for example, both sides) in the scanning direction S1 (main scanning direction S1) of the carriage 13 with respect to the carriage 13, and cures the photocurable ink (ultraviolet curable ink) by irradiating the photocurable ink, which is discharged from the ink head 14 onto the medium Me, with ultraviolet light.

Figure 3:
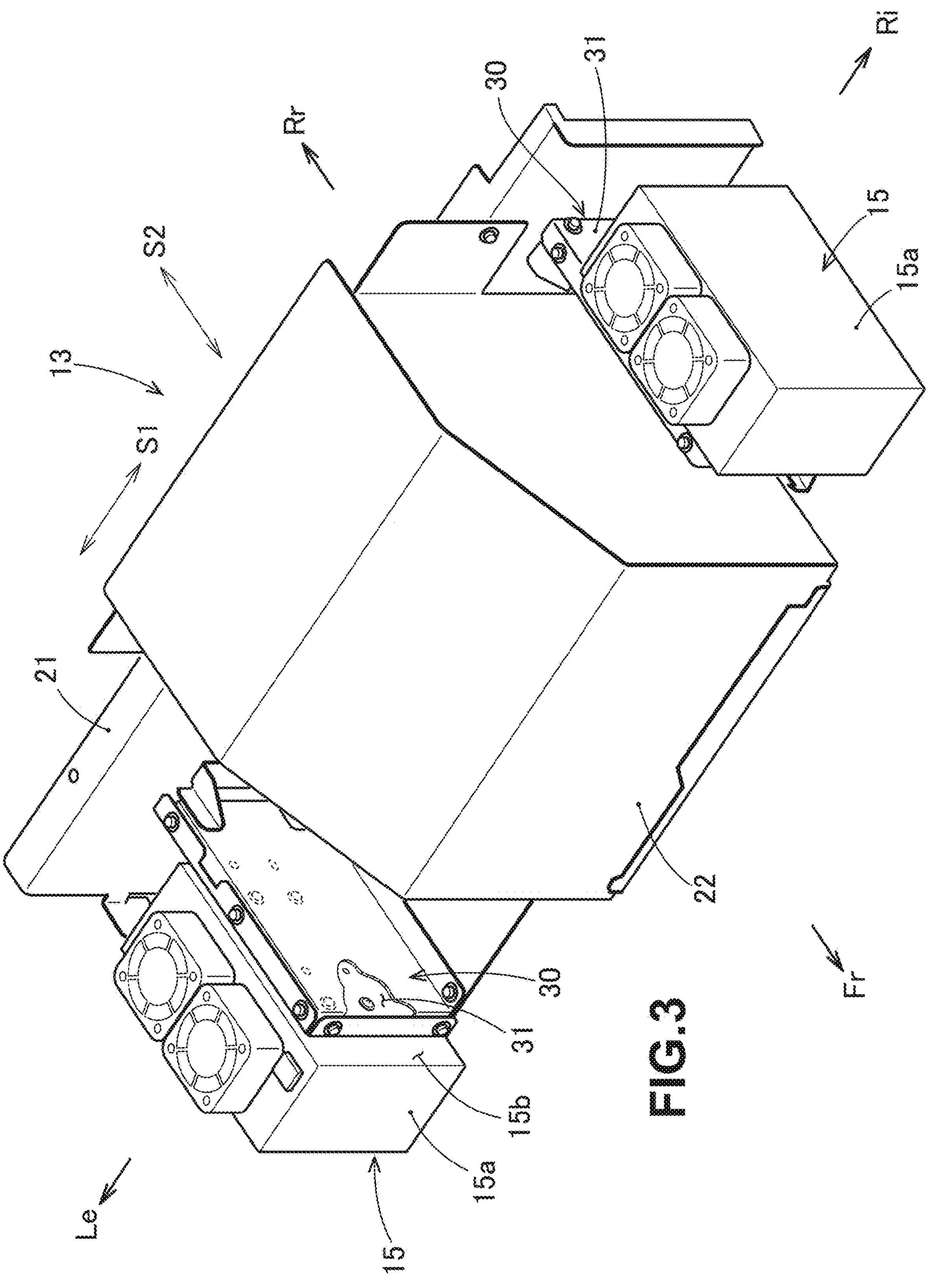
FIG. 3 is a perspective view of a configuration in which an ink head holder and ultraviolet irradiators are fixed to a carriage illustrated in FIG. 1.

As illustrated in FIG. 3, the carriage 13 includes a carriage base 21 provided on the rail 12 (refer to FIG. 1) so as to be movable in the main scanning direction S1, an ink head holder 22 attached to a front surface of the carriage base 21, and right and left attachment structures 30 and 30 located on both sides in the main scanning direction S1 with respect to the ink head holder 22 and attached to the front surface of the carriage base 21.

The ink head holder 22 accommodates or holds the ink head 14 (refer to FIG. 1).

Figure 4:
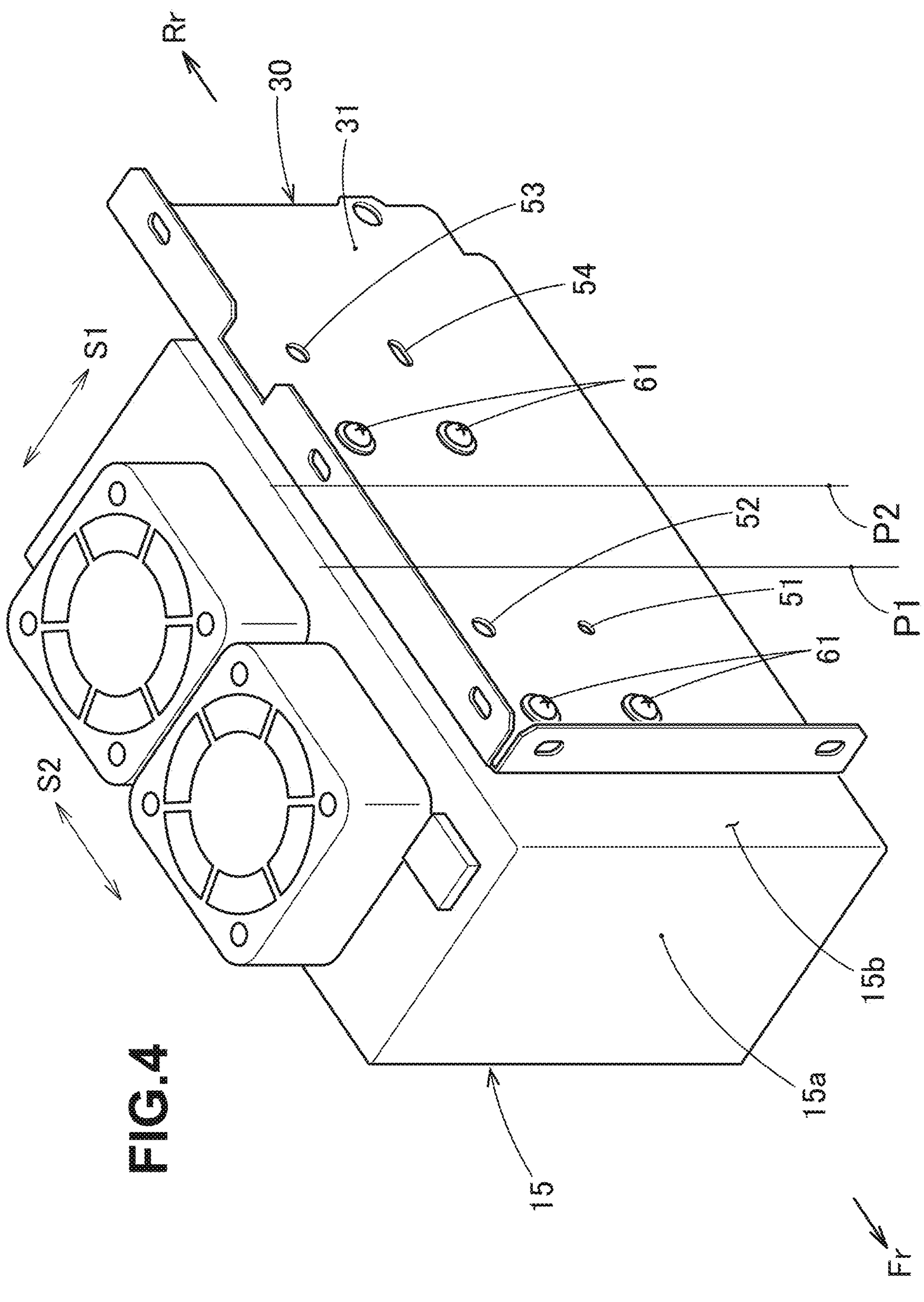
FIG. 4 is a perspective view of a configuration in which the left ultraviolet irradiator is assembled to a left attachment structure illustrated in FIG. 3.

As illustrated in FIGS. 3 and 4, the ultraviolet irradiator 15, 15 has, for example, a configuration in which an ultraviolet irradiation body (ultraviolet lamp) (not illustrated) is accommodated and assembled in a casing 15*a*, 15*a* with a rectangular parallelepiped or substantially rectangular parallelepiped shape, and has an irradiation surface on the lower surface to be irradiated with ultraviolet light.

The right and left attachment structures 30 and 30 are vertical plate-shaped structures. The ultraviolet irradiator 15, 15 is assembled to an outer surface of the attachment structure 30, 30 in the main scanning direction S1.

The ultraviolet irradiator 15, 15 can be set at a first position P1 on a front side Fr and a second position P2 on a rear side Rr in the sub-scanning direction S2 with respect to the ink head holder 22 and the ink head 14 (refer to FIG. 1). Specifically, the ultraviolet irradiator 15, 15 can be set at the first position P1 on the front side Fr and the second position P2 on the rear side Rr in the sub-scanning direction S2 with respect to the attachment structure 30, 30.

The first position P1 is a position where the ultraviolet irradiator 15, 15 is fixed to the attachment structure 30 when the conveying direction of the medium Me is unidirectional toward the front side Fr (for example, only a front direction Fr) in the sub-scanning direction S2. The second position P2 is a position where the ultraviolet irradiator 15, 15 is fixed to the attachment structure 30 when the conveying direction of the medium Me is bidirectional toward the front side Fr and the rear side Rr (both the front direction Fr and a rear direction Rr) in the sub-scanning direction S2.

Next, the assembly structure of the left ultraviolet irradiator 15 with respect to the left attachment structure 30 will be described in detail with reference to FIGS. 4 and 5. Since the assembly structure of the right ultraviolet irradiator 15 with respect to the right attachment structure 30 is the same except that the assembly structure is bilaterally symmetrical to the left assembly structure, the description thereof will be omitted.

A plurality (for example, four) screw holes 15*c* are provided in a side surface 15*b* of the ultraviolet irradiator 15 (side surface 15*b* of the casing 15*a*) that is attached to the attachment structure 30. The side surface 15*b* may be referred to as an "attached surface 15*b*".

The attachment structure 30 includes a vertical plate portion 31 which has a flat plate or substantially flat plate shape and on which the attached surface 15*b* can be overlapped. The vertical plate portion 31 includes a plurality (two) of fixing portions 40 and 50 to select one of the first position P1 on the front side Fr and the second position P2 on the rear side Rr and to fix the ultraviolet irradiator 15. One of the two fixing portions 40 and 50 is referred to as a first fixing portion 40, and the other is referred to as a second fixing portion 50.

The first fixing portion 40 includes four front holes 41 to 44 to fix the ultraviolet irradiator 15 at the first position P1 on the front side Fr. The front holes 41 to 44 may be referred to as "unidirectional holes 41 to 44". The second fixing portion 50 includes four rear holes 51 to 54 to fix the ultraviolet irradiator 15 at the second position P2 on the rear side Rr. The rear holes 51 to 54 may be referred to as "bidirectional holes 51 to 54". The four front holes 41 to 44 and the four rear holes 51 to 54 are configured as through-holes penetrating through the vertical plate portion 31. The intervals between the four front holes 41 to 44 and the intervals between the four rear holes 51 to 54 coincide with the intervals between the four screw holes 15*c* of the ultraviolet irradiator 15.

By setting the shapes of the four front holes 41 to 44 and the shapes of the four rear holes 51 to 54 to different shapes, it is possible to distinguish between the first position P1 and the second position P2. For example, as illustrated in FIG. 5, the shape of the four front holes 41 to 44 is rectangular, and the shape of the four rear holes 51 to 54 is round.

Figure 5:
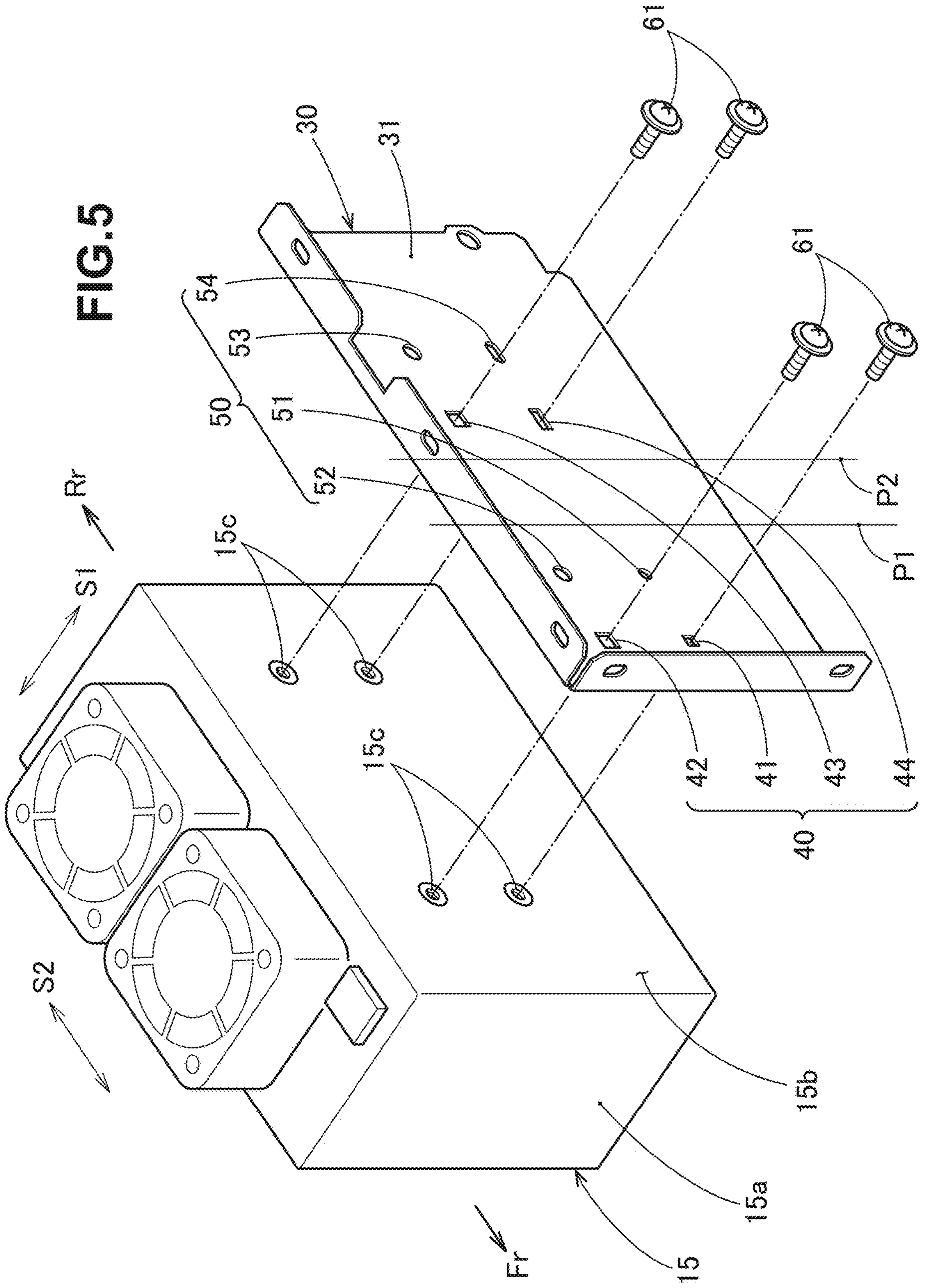
FIG. 5 is an exploded view with the left ultraviolet irradiator removed from the left attachment structure illustrated in FIG. 4.

For example, as illustrated in FIG. 5, when the vertical plate portion 31 of the left attachment structure 30 faces the attached surface 15*b* of the left ultraviolet irradiator 15, one of the four front holes 41 to 44 is designated as a first front hole 41, and the other front holes arranged clockwise in the figure with reference to the first front hole 41 are designated as a second front hole 42, a third front hole 43, and a fourth front hole 44.

The first front hole 41 is a reference hole to position the ultraviolet irradiator 15 at the first position P1 with respect to the vertical plate portion 31, and is a square hole located at the lower left of the vertical plate portion 31. The second front hole 42 is located above the first front hole 41 with respect to the vertical plate portion 31, and is a square hole larger than the first front hole 41. The third front hole 43 is located behind the second front hole 42 with respect to the vertical plate portion 31, and is a square hole with the same or substantially the same size as the second front hole 42.

The fourth front hole 44 is located below the third front hole 43 and behind the first front hole 41 with respect to the vertical plate portion 31, is a rectangular hole that is elongated (elongated hole) in the sub-scanning direction S2, and is the same or substantially the same size in hole width as the first front hole 41. In such a manner, the fourth front hole 44 disposed on the rear side in the sub-scanning direction S2 is longer in the sub-scanning direction S2 than the first front hole 41 and the second front hole 42 disposed on the front side in the sub-scanning direction S2.

When the four front holes 41 to 44 are aligned with the four screw holes 15*c* with reference to the first front hole 41, a misalignment in the sub-scanning direction S2 can be absorbed by the fourth front hole 44 with an elongated hole or substantially elongated hole shape, and an overall misalignment can be absorbed by the second front hole 42 and the third front hole 43 that are large. For this reason, the dimensional accuracy of the four screw holes 15*c* and the four front holes 41 to 44 can be absorbed, and positioning can be easily performed.

Similarly, when the vertical plate portion 31 of the left attachment structure 30 faces the attached surface 15*b* of the left ultraviolet irradiator 15, one of the four rear holes 51 to 54 is designated as a first rear hole 51, and the other rear holes arranged clockwise in the figure with reference to the first rear hole 51 are designated as a second rear hole 52, a third rear hole 53, and a fourth rear hole 54.

The first rear hole 51 is a reference hole to position the ultraviolet irradiator 15 at the second position P2 with respect to the vertical plate portion 31, and is a round hole located at the lower left of the vertical plate portion 31. The second rear hole 52 is located above the first rear hole 51 with respect to the vertical plate portion 31, and is a round hole with a larger diameter than the first rear hole 51. The third rear hole 53 is located behind the second rear hole 52 with respect to the vertical plate portion 31, and is a round hole with the same or substantially the same diameter as the second rear hole 52.

The fourth rear hole 54 is located below the third rear hole 53 and behind the first rear hole 51 with respect to the vertical plate portion 31, is a round hole that is elongated (elongated hole) in the sub-scanning direction S2, and is the same or substantially the same size in hole width as the first rear hole 51. In such a manner, the fourth rear hole 54 disposed on the rear side in the sub-scanning direction S2 is longer in the sub-scanning direction S2 than the first rear hole 51 and the second rear hole 52 disposed on the front side in the sub-scanning direction S2.

When the four rear holes 51 to 54 are aligned with the four screw holes 15*c* with reference to the first rear hole 51, a misalignment in the sub-scanning direction S2 can be absorbed by the fourth rear hole 54 with an elongated hole or substantially elongated hole shape, and an overall misalignment can be absorbed by the second rear hole 52 and the third rear hole 53 that are large. For this reason, the dimensional accuracy of the four screw holes 15*c* and the four rear holes 51 to 54 can be absorbed, and positioning can be easily performed.

The first rear hole 51 is located directly behind the first front hole 41. The second rear hole 52 is located directly behind the second front hole 42. The third rear hole 53 is located directly behind the third front hole 43. The fourth rear hole 54 is located directly behind the fourth front hole 44.

When the ultraviolet irradiator 15 is fixed to the attachment structure 30 at the first position P1 on the front side Fr, the four front holes 41 to 44 and the four screw holes 15*c* are aligned with each other, and are fixed by four bolts 61 (also refer to FIG. 3). On the other hand, when the ultraviolet irradiator 15 is fixed to the attachment structure 30 at the second position P2 on the rear side Rr, the four rear holes 51 to 54 and the four screw holes 15*c* are aligned with each other, and are fixed by four bolts 61.

Here, referring to FIG. 6, the concept of an irradiation range of ultraviolet light from the ultraviolet irradiator 15 with which the ultraviolet curable ink is irradiated, which is required to completely cure the ultraviolet curable ink discharged from the ink head 14 onto the medium Me, will be described.

Figure 6:
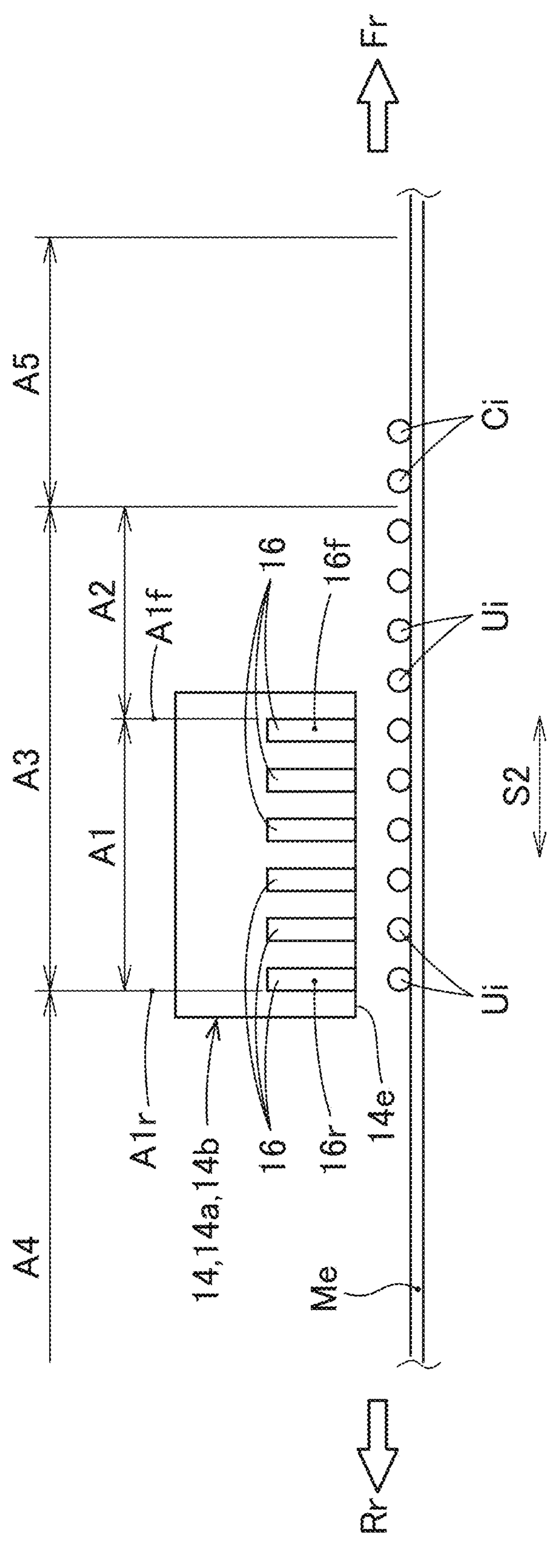
FIG. 6 is a conceptual view of the positional relationship between an ink head and the ultraviolet irradiator illustrated in FIG. 1 as viewed in a main scanning direction.

FIG. 6 conceptually represents the positional relationship between the ink head 14 and the irradiation range as viewed in the main scanning direction S1 (front-back direction in FIG. 6). FIG. 6 illustrates the positional relationship between the ink head 14 and the required irradiation range when the conveying direction of the medium Me is the front direction Fr (right direction in FIG. 6) of the sub-scanning direction S2.

In order to completely cure the ultraviolet curable ink discharged onto the medium Me, after the ink lands on the medium Me, the landed ink needs to be irradiated with a certain amount or more of ultraviolet light (cumulative irradiation amount) from the ultraviolet irradiator 15 (refer to FIG. 1). The cumulative irradiation amount of ultraviolet light is known as the cumulative value of the ultraviolet irradiance and the irradiation time.

The ink head 14 includes a plurality of nozzles 16. The ultraviolet curable ink is discharged from nozzle surfaces of the nozzles 16. A lower end surface 14*e* of the ink head 14 defines the nozzle surface 14*e* of each of the nozzles 16. As illustrated in FIG. 6, when the ink head 14 is viewed from one side in the main scanning direction S1 (front-back direction in FIG. 6), a range A1 in which the ultraviolet curable ink is discharged from each of the nozzles 16 arranged in the sub-scanning direction S2 is referred to as a "nozzle length A1 of the ink head 14" or a "nozzle range A1 of the ink head 14".

The nozzle length A1 of the ink head 14 is a distance from a frontmost nozzle 16*f* (front end A1*f*) to a rearmost nozzle 16*r* (rear end A1*r*) in the sub-scanning direction S2 among the nozzles 16. The nozzle length A1 of the ink head 14 is also a printing area in which an ultraviolet curable ink Ui is printed on the medium Me. The printing area is a range in the sub-scanning direction S2.

The ultraviolet curable ink Ui discharged from each of the nozzles 16 and adhered to the medium Me (adhered ink Ui) is in an uncured state as it is. When the printing direction is from the rear to the front (when the medium Me is conveyed toward the front side Fr), an irradiation range on the front side Fr required to cure the ultraviolet curable ink discharged from the ink head 14 at the front end A1*f* of the nozzle length A1 (distance required for curing) is A2. When the printing direction is from the rear to the front, a distance A3 obtained by adding the distance A2 required for curing to the nozzle length A1 of the ink head 14 is an irradiation range A3 required to ensure the cumulative irradiation amount of ultraviolet light from the ultraviolet irradiator 15 (refer to FIG. 1) with which the ultraviolet curable ink Ui in an uncured state is irradiated. When the printing direction is from the rear to the front, the ultraviolet curable ink discharged from each of the nozzles 16 does not land in a range A4 on the rear side Rr of the rear end A1*r* of the nozzle length A1 of the ink head 14, so that the range A4 does not need to be irradiated with ultraviolet light from the ultraviolet irradiator 15. In addition, in a range A5 on the front side Fr of the distance A2 required for curing, the adhered ink Ui adhered to the medium Me is already cured, so that the ultraviolet curable ink Ui does not need to be irradiated with ultraviolet light from the ultraviolet irradiator 15.

Figure 7:
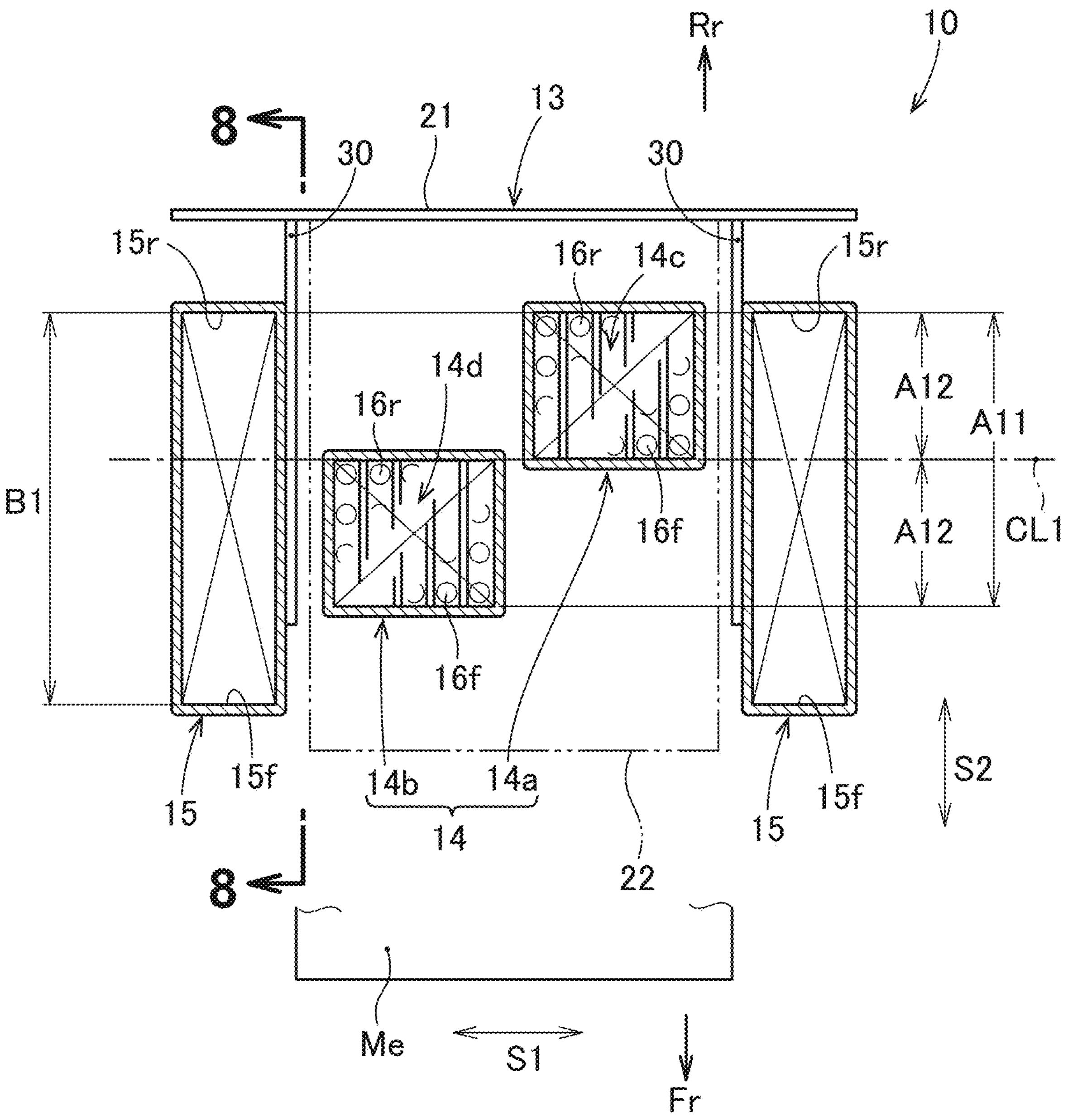
FIG. 7 is a schematic view schematically representing the positional relationship between the ink head and the ultraviolet irradiators illustrated in FIG. 3 as viewed from above when a conveying direction of a medium is unidirectional.

FIG. 7 schematically illustrates the carriage 13 illustrated in FIG. 3 as viewed from above. In the present preferred embodiment, as illustrated in FIG. 7, the ink head 14 includes two ink head units 14*a* and 14*b* (a first ink head unit 14*a* and a second ink head unit 14*b*).

The first ink head unit 14*a* (also referred to as a first ink head 14*a*) includes a first nozzle group 14*c* that discharges a first ink. The second ink head unit 14*b* (also referred to as a second ink head 14*b*) includes a second nozzle group 14*d* that discharges a second ink that is the same type as the first ink and at the same time that the first ink is discharged, or discharges a second ink different from the first ink before or after the first ink is discharged. Each of the nozzle groups 14*c* and 14*d* is a collection of a plurality of the nozzles 16 (discharge holes 16) each discharging the ink toward the medium Me. In such a manner, the ink head 14 includes the first nozzle group 14*c* and the second nozzle group 14*d*.

The first nozzle group 14*c* and the second nozzle group 14*d* are displaced from each other in the conveying direction S2 (sub-scanning direction S2) of the medium Me. In more detail, the second nozzle group 14*d* is offset to the front side Fr in the sub-scanning direction S2 with respect to the first nozzle group 14*c*.

In the case of a configuration including the two ink head units 14*a* and 14*b*, there are the following two usages.

As illustrated in FIG. 7, a first usage is a normal printing usage in which only the same type of color inks (CMYK) on the medium Me are discharged from the first ink head unit 14*a* (color ink head 14*a*) and the second ink head unit 14*b* (color ink head 14*b*). In other words, both the first ultraviolet or UV curable ink and the second UV curable ink are color inks.

In the case of normal printing, the conveying direction S2 is only on one side from the rear side Rr to the front side Fr. Therefore, an irradiation range B1 (irradiation area B1) of the ultraviolet irradiator 15 is expanded only to the front side Fr of the nozzle 16*f* on the downstream side (frontmost nozzle 16*f*) of the first ink head unit 14*a*, namely, to a downstream side in the conveying direction S2 to ensure the cumulative irradiation amount of the ultraviolet irradiator 15.

Figure 9:
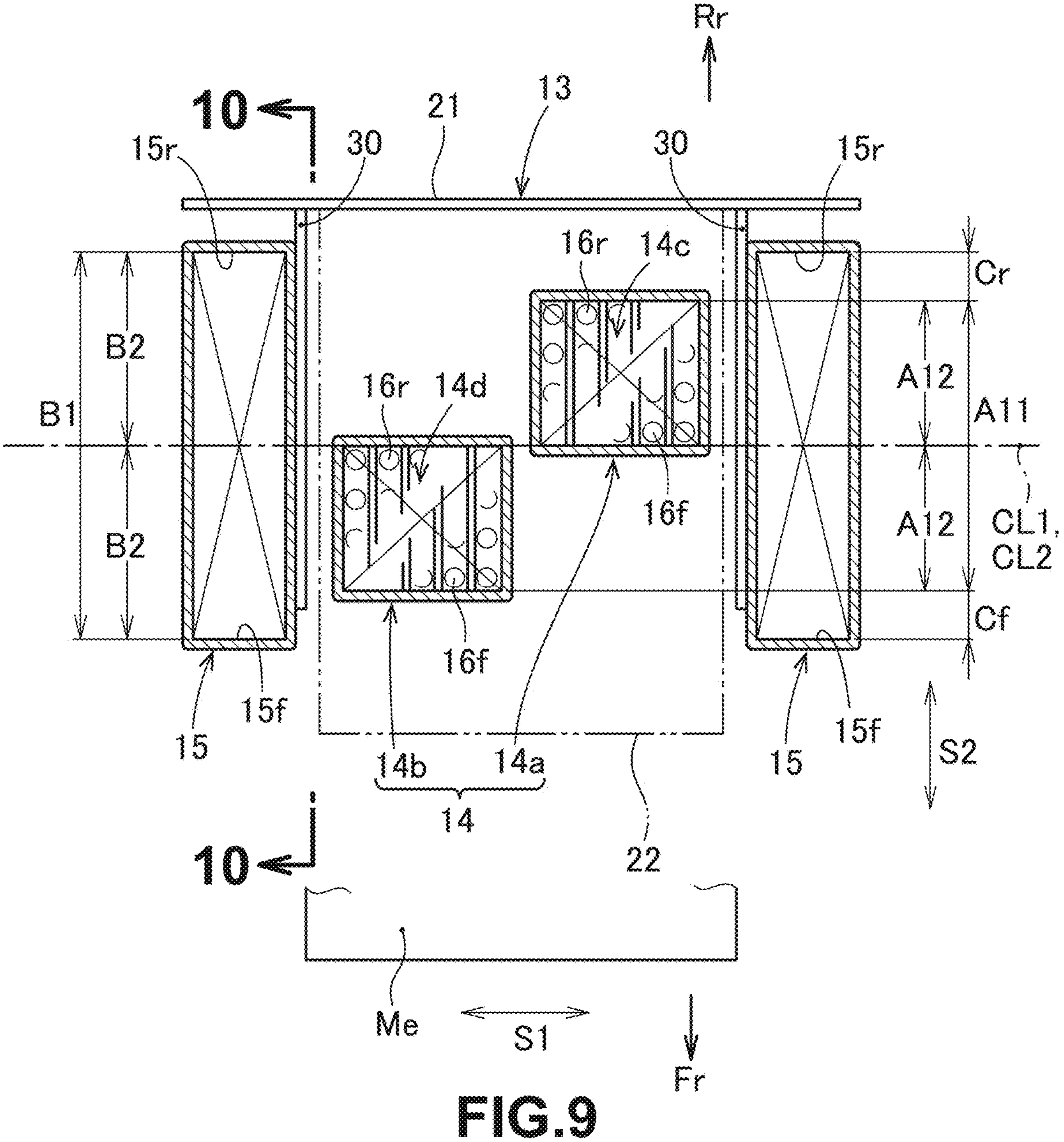
FIG. 9 is a schematic view schematically representing the positional relationship between the ink head and the ultraviolet irradiators illustrated in FIG. 3 as viewed from above when the conveying direction of the medium is bidirectional.

As illustrated in FIG. 9, a second usage is a special printing usage in which a special ink different from the color ink (CMYK) is discharged from the second ink head 14*b* (special ink head 14*b*) before or after (timing before or after) the color ink is discharged onto the medium Me. In other words, one of the first UV curable ink and the second UV curable ink is a color ink, and the other of them is a special ink.

In the case of special printing, the conveying direction S2 (the front side Fr or the rear side Rr) of the medium Me differs depending on the timing that the special ink is discharged.

When the special ink is discharged before the color ink is discharged (primary coating formation), the conveying direction S2 of the medium Me is defined such that the second ink head 14*b* is located on the upstream side of the first ink head unit 14*a* in the conveying direction S2 (the medium Me is conveyed from the front side Fr to the rear side Rr).

In addition, when the special ink is discharged after the color ink is discharged (gloss formation), the conveying direction S2 of the medium Me is defined such that the second ink head 14*b* is located on the downstream side of the first ink head unit 14*a* in the conveying direction S2 (the medium Me is conveyed from the rear side Rr to the front side Fr).

Therefore, the conveying directions S2 are opposite between when the special ink is discharged before the color ink is discharged (primary coating formation) and when the special ink is discharged after the color ink is discharged (gloss formation). For this reason, in the case of special printing, it is necessary to secure the irradiation area B1 expanded to the downstream side in the conveying direction from the nozzle on the downstream side in the conveying direction S2, namely, to the front or rear of a nozzle length A11 in the first and second ink head units 14*a* and 14*b* (hereinafter, abbreviated as the "nozzle length A11").

FIG. 7 illustrates a disposition example of the ultraviolet irradiator 15, 15 with respect to the carriage 13 in the case of the first usage. In the first usage, a rear end 15*r* of the irradiation range B1 (irradiation area B1) of the ultraviolet irradiator 15 is located at the rearmost nozzle 16*r* (rear end 16*r* of the nozzle length) of the first ink head unit 14*a*, so that the irradiation range B1 of the ultraviolet irradiator 15 is expanded only to the downstream side of the nozzle length A11 in the conveying direction S2 to ensure the cumulative irradiation amount of ultraviolet light with which the irradiation range is irradiated. The ink does not land on the upstream side of the nozzle length A11 in the conveying direction S2, namely, on the rear side Rr of the nozzle length A11. For this reason, a wasteful irradiation area on the rear side Rr of the nozzle length A11 can be eliminated by aligning the rear end 15*r* of the irradiation range B1 of the ultraviolet irradiator 15 with the rearmost nozzle 16*r* of the first ink head unit 14*a*. On the other hand, since the irradiation area can be expanded to the downstream side of the nozzle length A11 in the conveying direction S2 which contributes to the curing of the ink, namely, to the front side Fr of the nozzle length A11 by the extent that the wasteful irradiation area on the rear side Rr is eliminated, the curing time can be shortened to that extent, and the printing speed can be increased.

Figure 8:
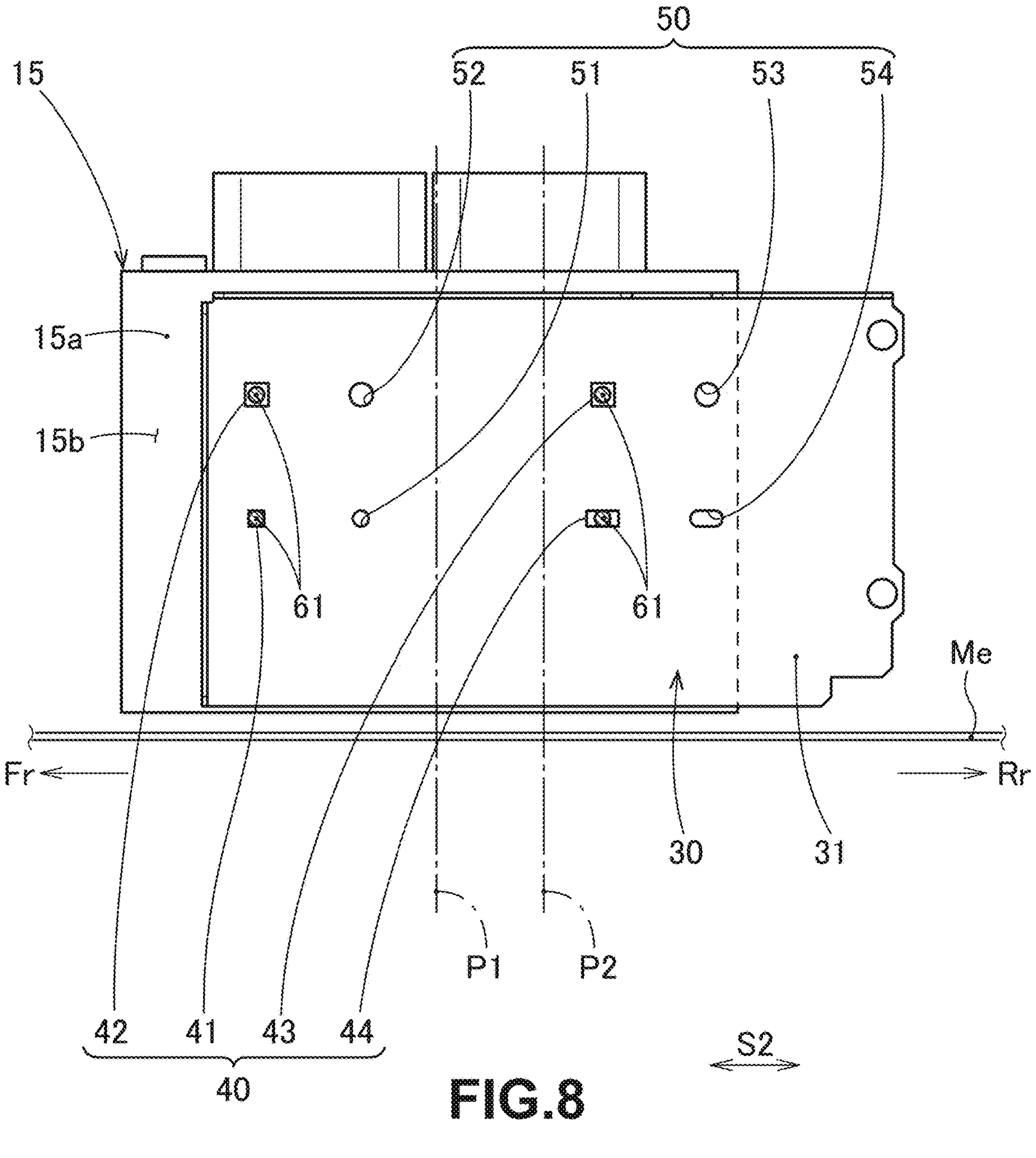
FIG. 8 is a side view illustrating an assembled state of the attachment structure and the ultraviolet irradiator as viewed in a direction along line 8-8 in FIG. 7.

FIG. 8 illustrates the assembly structure of the left ultraviolet irradiator 15 with respect to the left attachment structure 30 in the case of the first usage illustrated in FIG. 7 (when the medium Me is conveyed unidirectionally). In the case of the first usage, the front holes 41 to 44 (unidirectional holes 41 to 44) are selected. Since the ultraviolet irradiator 15 is fixed to the attachment structure 30 at the first position P1 on the front side Fr, the four front holes 41 to 44 (unidirectional holes 41 to 44) and the four screw holes 15*c* are aligned with each other, and are fixed by the four bolts 61 (also refer to FIG. 4).

On the other hand, FIG. 9 illustrates a disposition example of the ultraviolet irradiator 15, 15 with respect to the carriage 13 in the case of the second usage. In the second usage, a center position CL2 of the irradiation range B1 (irradiation area B1) of the ultraviolet irradiator 15, 15 is located at a center position CL1 of the entirety of the two ink head units 14*a* and 14*b* (center position CL1 of the ink head 14), so that the irradiation range B1 of the ultraviolet irradiator 15 is expanded to both the upstream side and the downstream side of the nozzle length A11 in the conveying direction S2 to ensure the cumulative irradiation amount of ultraviolet light for irradiation.

In detail, as illustrated in FIG. 9, the second ink head unit 14*b* is offset to the front side Fr in the sub-scanning direction S2 with respect to the first ink head unit 14*a*.

The total nozzle length A11 of the two ink head units 14*a* and 14*b* in the sub-scanning direction S2 is a distance from the rearmost nozzle 16*r* of the first ink head unit 14*a* to the frontmost nozzle 16*f* of the second ink head unit 14*b*. The nozzle length of each of the first ink head unit 14*a* and the second ink head unit 14*b* in the sub-scanning direction S2 is A12, and is half of the total nozzle length A11.

A half-point of the irradiation range B1 of the ultraviolet irradiator 15, 15 in the sub-scanning direction S2, namely, a point CL2 of B2 is the center position CL2 of the irradiation range B1. The center position CL2 of the irradiation range B1 of the ultraviolet irradiator 15, 15 is located at the center position CL1 of the ink head 14 (center position CL1 of the nozzle length A11).

In this case, a distance Cr from the rearmost nozzle 16*r* of the first ink head unit 14*a* to the rear end 15*r* of the irradiation range B1 of the ultraviolet irradiator 15, 15 is referred to as a "rear distance Cr". A distance Cf from the frontmost nozzle 16*f* of the second ink head unit 14*b* to a front end 15*f* of the irradiation range B1 of the ultraviolet irradiator 15, 15 is referred to as a "front distance Cf". The rear distance Cr and the front distance Cf are set to the distance A2 required to cure the discharged ultraviolet curable ink (distance A2 required for curing illustrated in FIG. 6).

Figure 10:
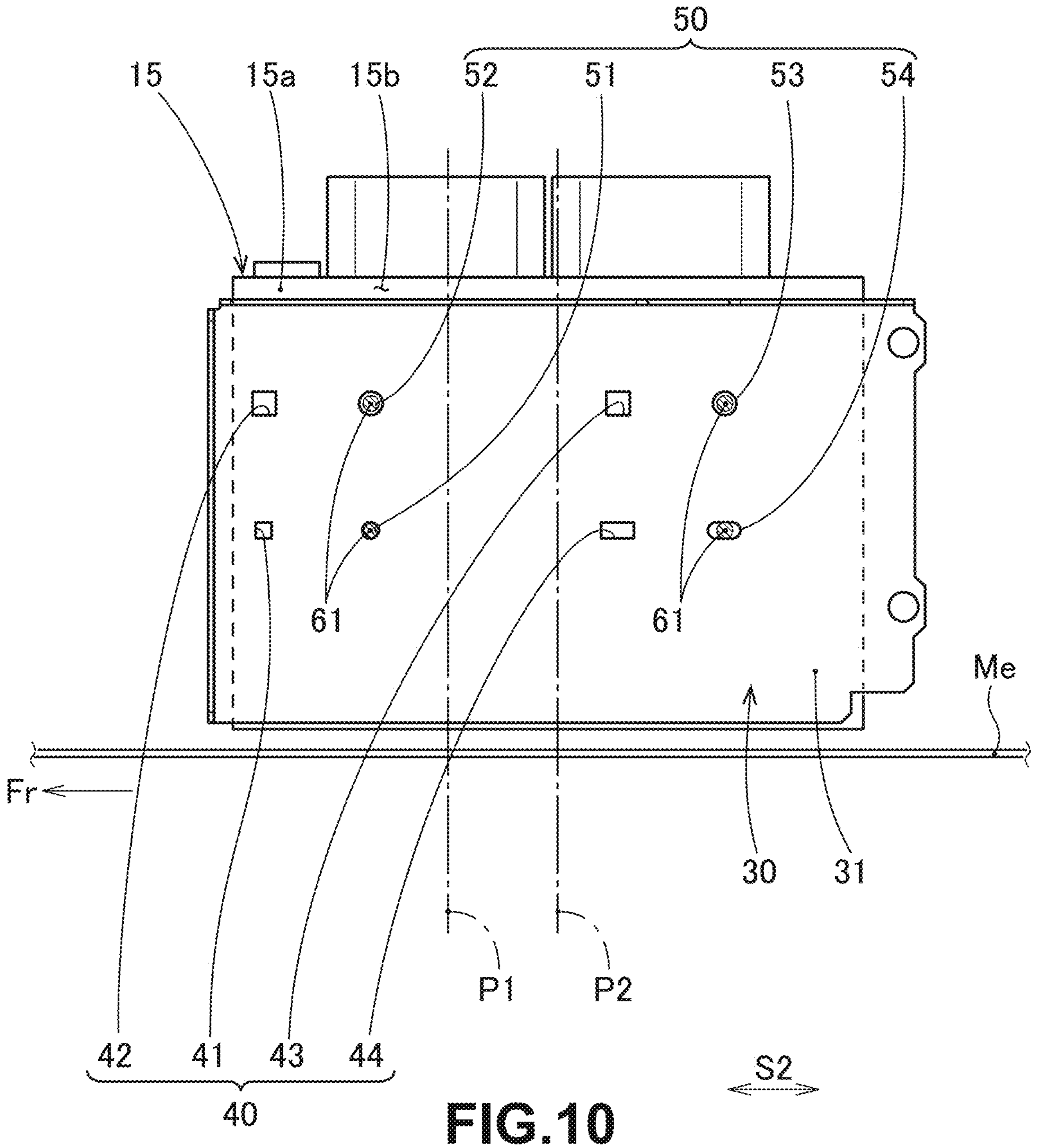
FIG. 10 is a side view illustrating an assembled state of the attachment structure and the ultraviolet irradiator as viewed in a direction along line 10-10 in FIG. 9.

FIG. 10 illustrates the assembly structure of the left ultraviolet irradiator 15 with respect to the left attachment structure 30 in the case of the second usage illustrated in FIG. 9 (when the medium Me is conveyed bidirectionally). In the case of the second usage, the rear holes 51 to 54 (bidirectional holes 51 to 54) are selected. Since the ultraviolet irradiator 15 is fixed to the attachment structure 30 at the second position P2 on the rear side Rr, the four rear holes 51 to 54 (bidirectional holes 51 to 54) and the four screw holes 15*c* are aligned with each other, and are fixed by the four bolts 61.

The above description can be as follows.

As illustrated in FIGS. 1, 2, and 7, a printer 10 includes a table 11 to place a medium Me, a conveyor 17 to convey the medium Me placed on the table 11 in a conveying direction S2 (sub-scanning direction S2) (refer to FIG. 1), a carriage 13 to perform scanning in a direction S1 (main scanning direction S1) different from the conveying direction S2 of the medium Me, an ink head 14 including a first nozzle group 14*c* to discharge a first ink (a first ultraviolet curable ink) and a second nozzle group 14*d* to discharge a second ink (a second ultraviolet curable ink different from the first ink) before or after the first ink is discharged or at the same time as the first ink is discharged, and mounted on the carriage 13, an ultraviolet irradiator 15, 15 on at least one side in the scanning direction S1 (main scanning direction S1) of the carriage 13 with respect to the carriage 13 to irradiate the first ultraviolet curable ink and the second ultraviolet curable ink with ultraviolet light, the first and second ultraviolet curable ink being discharged onto the medium Me, and an attachment structure 30, 30 including a plurality of fixing portions 40 and 50 (refer to FIG. 5) to fix the ultraviolet irradiator 15, 15.

As illustrated in FIGS. 1, 2, and 7, the conveyor 17 is operable to convey the table 11 or the medium Me unidirectionally from one side to the other side or from the other side to the one side in the conveying direction S2 of the medium Me or bidirectionally from the one side to the other side and from the other side to the one side in the conveying direction S2 of the medium Me depending on a type of the first and the second ultraviolet curable inks discharged from the first nozzle group 14*c* and the second nozzle group 14*d*.

For example, when the second ultraviolet curable ink (color ink; CMYK) is discharged from the second nozzle group 14*d* is discharged at the same time as the first ultraviolet curable ink (color ink; CMYK) is discharged from the first nozzle group 14*c*, the conveyor 17 is configured to be capable of conveying the table 11 or the medium Me unidirectionally from the one side (for example, a rear side Rr) to the other side (for example, a front side Fr) or the other side to the one side in the conveying direction S2 of the medium Me, and when the second ultraviolet curable ink (special ink) is discharged from the second nozzle group 14*d* before or after the first ultraviolet curable ink (color ink; CMYK) is discharged the first nozzle group 14*c*, the conveyor 17 is operable to convey the table 11 or the medium Me bidirectionally from the one side to the other side and from the other side to the one side in the conveying direction S2 of the medium Me.

As illustrated in FIGS. 7 and 9, the attachment structure 30, 30 is configured such that a position of the ultraviolet irradiator 15, 15 with respect to the carriage 13 is changeable by selecting one fixing portion from the plurality of fixing portions 40 and 50 (refer to FIG. 5) depending on whether the conveying direction S2 of the table 11 or the medium Me is unidirectional or bidirectional.

For this reason, as illustrated in FIGS. 7 and 9, the position of the ultraviolet irradiator 15, 15 in the sub-scanning direction S2 with respect to the carriage 13 can be easily adjusted simply by selecting one fixing portion from the plurality of fixing portions 40 and 50 provided in the attachment structure 30 and attaching the ultraviolet irradiator 15, 15. Moreover, with a simple configuration, a wasteful irradiation area which occurs depending on the type of printing selected and which does not contribute to the curing of the ink can be eliminated by adjusting the position of the ultraviolet irradiator 15, 15 in the sub-scanning direction S2 with respect to the carriage 13.

Furthermore, as illustrated in FIGS. 7 and 8, when the table 11 (refer to FIG. 1) is configured to be unidirectionally conveyable, the ultraviolet irradiator 15, 15 is fixed to the attachment structure 30 by selecting a first fixing portion 40 from the plurality of fixing portions 40 and 50.

As illustrated in FIGS. 9 and 10, when the table 11 (refer to FIG. 1) is bidirectionally conveyable, the ultraviolet irradiator 15, 15 is fixed to the attachment structure 30 by selecting a second fixing portion 50 from the plurality of fixing portions 40 and 50.

The ultraviolet irradiator 15, 15 protrudes to only one of the one side and the other side in the conveying direction S2 with respect to a nozzle length A11 by selecting the first fixing portion 40 (enabling unidirectional conveyance), the nozzle length A11 being a length of the first nozzle group 14*c* and the second nozzle group 14*d* in the conveying direction S2.

The ultraviolet irradiator 15, 15 protrudes to the one side and the other side in the conveying direction S2 with respect to the nozzle length A11 by selecting the second fixing portion 50 (enabling bidirectional conveyance).

In such a manner, when the conveying direction S2 (sub-scanning direction S2) of the medium Me is unidirectional, an irradiation range B1 of the ultraviolet irradiator 15, 15 does not need to be located behind a rear end 16*r* of the first ink head unit 14*a*. For this reason, the irradiation range B1 of the ultraviolet irradiator 15, 15 is lengthened to the front side Fr in the conveying direction S2 (sub-scanning direction S2), which allows the area to be cured is be expanded to that extent, so that the curing speed can be increased to that extent. As a result, the printing time can be shortened, so that printing efficiency can be increased.

On the other hand, when the conveying direction S2 (sub-scanning direction S2) of the medium Me is bidirectional, the irradiation range B1 of the ultraviolet irradiator 15, 15 is located at the center of the ink head 14. Therefore, even if a photocurable ink is discharged first from either ink head unit of the first ink head unit 14*a* or the second ink head unit 14*b*, the curing area can be ensured downstream in the conveying direction from the other ink head unit that discharged a photocurable ink later. For this reason, the photocurable ink (ultraviolet curable ink) can be reliably cured bidirectionally.

Furthermore, as illustrated in FIGS. 7 and 8, when printing in which the second nozzle group 14*d* discharges the second ink (color ink) at the same time as the first nozzle group 14*c* discharges the first ink (color ink), or in which both the first UV curable ink and the second UV curable ink are color inks, is performed (when the conveying direction S2 of the medium Me is unidirectional), the ultraviolet irradiator 15, 15 is fixed to the attachment structure 30, 30 by selecting a first fixing portion 40 from the plurality of fixing portions 40 and 50.

As illustrated in FIGS. 9 and 10, when printing in which the second nozzle group 14_d_ discharges the second ultraviolet curable ink before or after the first nozzle group 14_c_ discharges the first ultraviolet curable ink, or in which one of the first UV curable ink and the second UV curable ink is a color ink, and the other of them is a special ink, is performed (when the conveying direction S2 of the medium Me is bidirectional), the ultraviolet irradiator 15, 15 is fixed to the attachment structure 30, 30 by selecting a second fixing portion 50 from the plurality of fixing portions 40 and 50.

As illustrated in FIGS. 7 and 8, an end of an irradiation range B1 of the ultraviolet irradiator 15, 15 on one of the one side and the other side in the conveying direction S2 is located at an end of a nozzle length A11 on one of the one side and the other side in the conveying direction S2 by selecting the first fixing portion 40, the nozzle length A11 being a length of the first nozzle group 14_c_ and the second nozzle group 14_d_ in the conveying direction S2.

As illustrated in FIGS. 9 and 10, a center position CL2 of the irradiation range B1 of the ultraviolet irradiator 15, 15 in the conveying direction S2 is located at a center position CL1 of the nozzle length A11 in the conveying direction S2 by selecting the second fixing portion 50.

In such a manner, when the conveying direction S2 (sub-scanning direction S2) of the medium Me is unidirectional, the irradiation range B1 of the ultraviolet irradiator 15, 15 does not need to be located behind the rear end 16_r_ of a nozzle length A1 of the ink head 14. For this reason, the irradiation range B1 of the ultraviolet irradiator 15, 15 is lengthened to the front side in the conveying direction S2 (sub-scanning direction S2), so that the printing speed can be increased to that extent. As a result, the printing time can be shortened, so that printing efficiency can be increased. On the other hand, when the conveying direction S2 (sub-scanning direction S2) of the medium Me is bidirectional, the irradiation range B1 of the ultraviolet irradiator 15, 15 is located at the center CL1 of the nozzle length A1 of the ink head 14, so that the photocurable ink can be reliably cured bidirectionally.

Furthermore, the plurality of fixing portions 40 and 50 include bidirectional holes 51 to 54 selected when the medium Me is conveyed bidirectionally as illustrated in FIGS. 9 and 10, and unidirectional holes 41 to 44 selected when the medium Me is conveyed unidirectionally as illustrated in FIGS. 7 and 8. Shapes of the bidirectional holes 51 to 54 and the unidirectional holes 41 to 44 are different from each other.

For this reason, when the position of the ultraviolet irradiator 15, 15 in the sub-scanning direction S2 is set with respect to the carriage 13, the position of the ultraviolet irradiator 15, 15 with respect to the attachment structure 30, 30 can be accurately determined.

Furthermore, as illustrated in FIG. 5, the bidirectional holes 51 to 54 and the unidirectional holes 41 to 44 are disposed on a front side Fr and a rear side Rr of the medium Me in the conveying direction S2 (sub-scanning direction S2), respectively. One of each hole 51, 41 disposed on the front side Fr and each hole 54, 44 (elongated hole 54, 44) disposed on the rear side Rr is longer than the other hole in the conveying direction S2.

For this reason, when the position of the ultraviolet irradiator 15, 15 in the sub-scanning direction S2 is set with respect to the carriage 13, the dimensional accuracy of the attachment structure 30, 30 and the ultraviolet irradiator 15, 15 can be absorbed by the elongated hole 54, 44, and positioning can be easily performed.

Printers according to various preferred embodiments of the present invention are not limited to the above-described preferred embodiments as long as the actions and the effects of the present invention can be achieved. In the present preferred embodiment, a flatbed printer has been described. However, preferred embodiments of the present invention may be applied to a roll-to-roll (R2R) printer when the R2R printer can perform printing unidirectionally and bidirectionally.

In the present preferred embodiment, in the case of normal printing, the case where the conveying direction S2 (sub-scanning direction S2) of the medium Me is unidirectional has been described. However, in the case of special printing, the conveying direction S2 (sub-scanning direction S2) of the medium Me may be set to be unidirectional.

For example, as illustrated in FIG. 7, even when a color ink (CMYK) is discharged from the first nozzle group 14_c_ and a special ink different from the color ink (CMYK) is discharged from the second nozzle group 14_d_ (performing gloss formation), the conveyor 17 (refer to FIG. 1) may be configured to be capable of conveying the table 11 (refer to FIG. 1) unidirectionally from the one side (for example, the rear side Rr) to the other side (for example, the front side Fr) in the conveying direction S2 of the medium Me. In that case, for example, the position of the ultraviolet irradiator 15, 15 in the sub-scanning direction S2 may be set such that a rear end 15_r_ of the irradiation range B1 of the ultraviolet irradiator 15 is located at a rearmost nozzle 16_r_ (rear end 16_r_ of the nozzle length) of a first ink head unit 14_a_.

Even when a color ink (CMYK) is discharged from the first nozzle group 14_c_ and a special ink different from the color ink (CMYK) is discharged from the second nozzle group 14_d_ (performing gloss formation), the conveyor 17 may be configured to be capable of conveying the table 11 (refer to FIG. 1) unidirectionally from the other side (for example, the front side Fr) to the one side (for example, the rear side Rr) in the conveying direction S2 of the medium Me. In that case, for example, the position of the ultraviolet irradiator 15, 15 in the sub-scanning direction S2 may be set such that a front end 15_f_ of the irradiation range B1 of the ultraviolet irradiator 15 is located at a frontmost nozzle 16_f_ (front end 16_f_ of the nozzle length) of a second ink head unit 14_b_.

In addition, in the present preferred embodiment, in the case of special printing, the conveying direction S2 (sub-scanning direction S2) of the medium Me is bidirectional. However, in the case of normal printing, the conveying direction S2 of the medium Me may be set to bidirectional if there is a reason such as wanting to change the discharge timing depending on the type of ink. In this case, the position of the ultraviolet irradiator 15, 15 in the sub-scanning direction S2 may be set such that the irradiation area B1 expanded to the front or rear of the nozzle length A11 can be secured.

Printers according to preferred embodiments of the present invention may be inkjet printers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for positioning an ultraviolet irradiator in a printer wherein the printer comprises:

a table to place a medium;

a conveyor to convey the medium placed on the table in a conveying direction;

a carriage to perform scanning in a direction different from the conveying direction of the medium;

an ink head including a first nozzle group to discharge a first ultraviolet curable ink and a second nozzle group to discharge a second ultraviolet curable ink before or after the first ultraviolet curable ink is discharged or at the same time as the first ultraviolet curable ink is discharged, is mounted on the carriage;

the ultraviolet irradiator is disposed on at least one side in the scanning direction of the carriage with respect to the carriage to irradiate the ultraviolet curable ink with ultraviolet light, the first and the second ultraviolet curable inks being discharged onto the medium; and an attachment structure including a plurality of fixing portions to fix the ultraviolet irradiator; wherein the conveyor is operable to convey the table or the medium unidirectionally from one side to the other side or from the other side to the one side in the conveying direction of the medium or bidirectionally from the one side to the other side and from the other side to the one side in the conveying direction of the medium depending on types of the first ultraviolet curable ink and the second ultraviolet curable ink discharged from the first nozzle group and the second nozzle group; and wherein the method comprises:

changing a position of the ultraviolet irradiator with respect to the carriage by selecting one fixing portion from the plurality of fixing portions depending on whether the conveying direction of the table or the medium is unidirectional or bidirectional.

2. The method according to claim 1, wherein when the table is operated to convey unidirectionally, the ultraviolet irradiator is fixed to the attachment structure by selecting a first fixing portion from the plurality of fixing portions;

when the table is operated to convey bidirectionally, the ultraviolet irradiator is fixed to the attachment structure by selecting a second fixing portion from the plurality of fixing portions;

the ultraviolet irradiator protrudes to only one of the one side and the other side in the conveying direction with respect to a nozzle length by selecting the first fixing portion, the nozzle length being a length of the first nozzle group and the second nozzle group in the conveying direction; and the ultraviolet irradiator protrudes to the one side and the other side in the conveying direction with respect to the nozzle length by selecting the second fixing portion.

3. The method according to claim 1, wherein when the both the first ultraviolet curable ink and the second ultraviolet curable ink are color inks, the ultraviolet irradiator is fixed to the attachment structure by selecting a first fixing portion from the plurality of fixing portions;

when one of the first ultraviolet curable ink and the second ultraviolet curable ink is a color ink, and the other of the first ultraviolet curable ink and the second ultraviolet curable ink is a special ink, the ultraviolet irradiator is fixed to the attachment structure by selecting a second fixing portion from the plurality of fixing portions;

an end of an irradiation range of the ultraviolet irradiator on one of the one side and the other side in the conveying direction is located at an end of a nozzle length on one of the one side and the other side in the conveying direction by selecting the first fixing portion, the nozzle length being a length of the first nozzle group and the second nozzle group in the conveying direction; and a center position of the irradiation range of the ultraviolet irradiator in the conveying direction is located at a center position of the nozzle length in the conveying direction by selecting the second fixing portion.

4. The method according to claim 1, wherein the plurality of fixing portions include bidirectional holes selected when the medium is conveyed bidirectionally, and unidirectional holes selected when the medium is conveyed unidirectionally; and shapes of the bidirectional holes and the unidirectional holes are different from each other.

5. The method according to claim 4, wherein the bidirectional holes and the unidirectional holes are on a front side and a rear side of the medium in the conveying direction, respectively; and one of each hole on the front side and each hole on the rear side is longer than the other hole in the conveying direction.

6. The method according to claim 2, wherein the plurality of fixing portions include bidirectional holes selected when the medium is conveyed bidirectionally; and unidirectional holes selected when the medium is conveyed unidirectionally; and shapes of the bidirectional holes and the unidirectional holes are different from each other.

7. The method according to claim 6, wherein the bidirectional holes and the unidirectional holes are on a front side and a rear side of the medium in the conveying direction, respectively; and one of each hole on the front side and each hole on the rear side is be longer than the other hole in the conveying direction.

8. The method according to claim 3, wherein the plurality of fixing portions include bidirectional holes selected when the medium is conveyed bidirectionally, and unidirectional holes selected when the medium is conveyed unidirectionally; and shapes of the bidirectional holes and the unidirectional holes are different from each other.

9. The method according to claim 8, wherein the bidirectional holes and the unidirectional holes are on a front side and a rear side of the medium in the conveying direction, respectively; and one of each hole on the front side and each hole on the rear side is longer than the other hole in the conveying direction.

* * * * *